Figure 1:
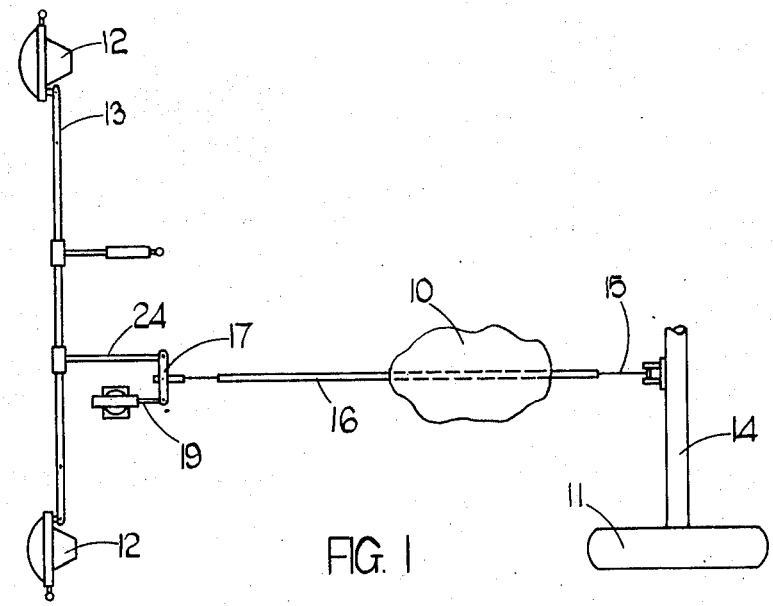

United States Patent [19]
Martin

[11] 3,973,114
[45] Aug. 3, 1976

[54] HEADLAMP TILTING DEVICE IN A MOTOR VEHICLE
[75] Inventor: Frederick Raymond Patrick Martin, Kent, England
[73] Assignee: The Lucas Electrical Company Limited, Birmingham, England
[22] Filed: July 15, 1975
[21] Appl. No.: 596,141

[30] Foreign Application Priority Data
July 24, 1974 United Kingdom............... 32636/74

[52] U.S. Cl............................ 240/7.1 LJ; 240/62 B; 240/62.62; 240/62.72
[51] Int. Cl.² .......................................... B60Q 1/00
[58] Field of Search ......... 240/7.1 LJ, 62.62, 62.63, 240/62.64, 62.72, 62 B

[56] References Cited
UNITED STATES PATENTS
3,728,538  4/1973  Bailly............................. 240/7.1 LJ
FOREIGN PATENTS OR APPLICATIONS
2,161,982  6/1973  Germany............................. 204/7.1
1,923,940  11/1969  Germany....................... 240/7.1 LJ Primary Examiner—Monroe H. Hayes
Attorney, Agent, or Firm—Holman & Stern

[57] ABSTRACT

A headlamp tilting system in a motor vehicle has opposite ends of an inner cable connected respectively to the rear axle housing of the vehicle and an intermediate portion of a lever. An outer sleeve surrounds the inner cable and abuts against the underside of the vehicle body. One end of the lever is pivotally mounted on the vehicle body via a damper while the other end thereof is connected to the vehicle headlamps through a further cable and a movement reducer including two spring arms. The damper is arranged to oppose relatively short term changes but to permit relatively long term change so that, under braking and acceleration conditions, the inner cable tilts the headlamps as a result of pivotal movement of the lever. Under changing load conditions, body movement of the lever takes place as permitted by the damper to effect a reduced headlamp tilt.

5 Claims, 6 Drawing Figures

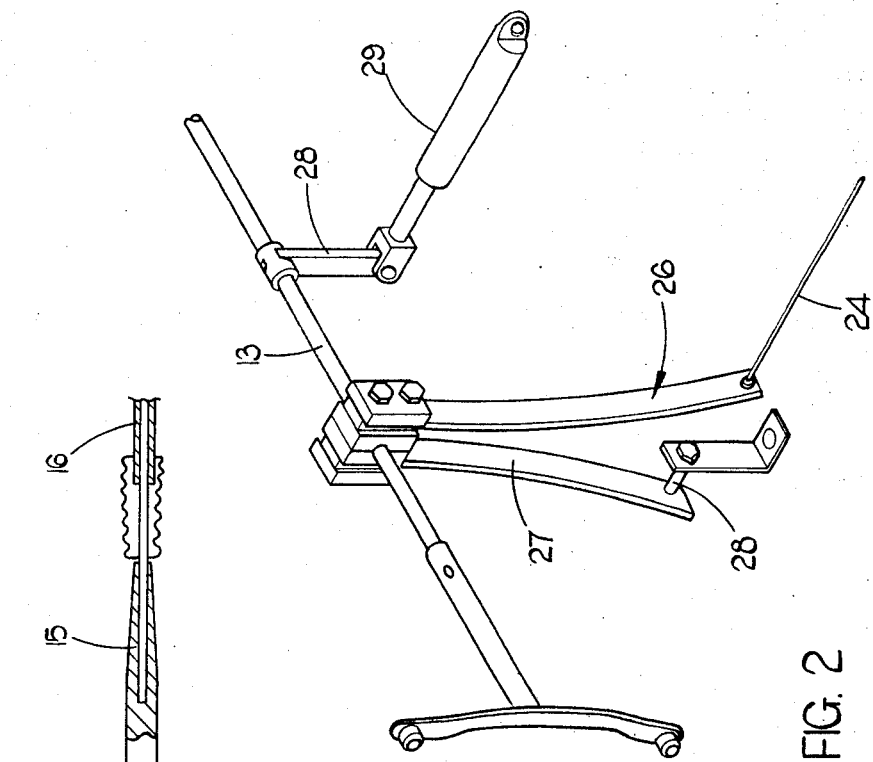
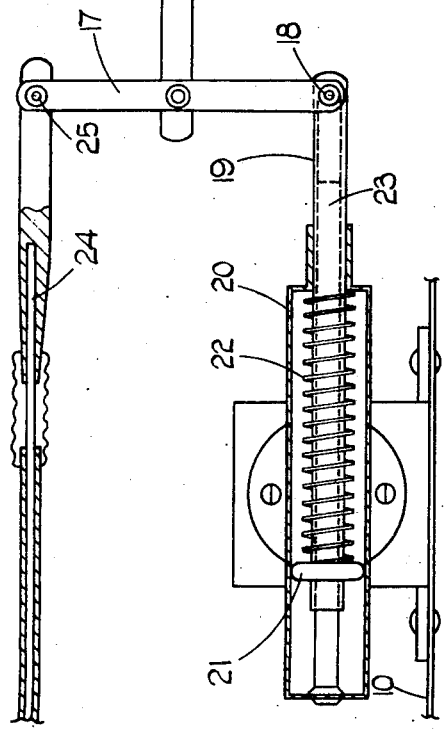
FIG. 2
FIG. 3

HEADLAMP TILTING DEVICE IN A MOTOR VEHICLE

This invention relates to a headlamp tilting device in a motor vehicle.

It has previously been proposed to provide a motor vehicle with a headlamp tilting device in which a sensor senses relatively long term changes such as those caused by changes in the load carried by the vehicle in the attitude of the vehicle body relative to wheels thereof, and output signals from the sensor are used to control the tilting movement of headlamps carried by the vehicle body. It has also been proposed to employ a mass movable relative to the body to sense acceleration and braking of the body to effect tilting of the headlamps in accordance with changes in the position of the mass relative to the body so that tilting of the headlamps occurs as a result of changes in the load carried by the vehicle body as well as during acceleration and braking of the motor vehicles.

It is an object of the present invention to provide a motor vehicle having headlamp tilting mechanism in which the above described control can be effected without the need for a mass movable relative to the body.

According to the present invention, there is provided, in a motor vehicle having a body and a headlamp mounted on the body for tilting movement in a vertical plane, a headlamp tilting device comprising a sensor for sensing the attitude of the vehicle body relative to wheels of the vehicle, said sensor being adapted to produce a mechanical out-put related to said attitude, and means operably interconnecting the sensor and the headlamps, said interconnecting means including a lever through which output movements of the sensor are transmitted to the headlamp, and a damper through the intermediary of which the lever is pivotally mounted on the body, the damper being of a type which opposes relatively short term movements so that a relatively long term change in the output of the sensor causes a bodily movement of the lever relative to the body whilst a relatively short term change in the output of the sensor causes a pivotal movement of the lever, the lever being connected with the sensor and with the headlamp in such a manner that a sensor output change which occurs for a relatively long term results in a smaller overall headlamp tilting movement than that resulting from the same sensor output change which occurs for a relatively short term.

Most advantageously, there is provided a second damper which serves to prevent very short term tilting movement of the headlamps which would otherwise occur as a result of very short term changes in the attitude of the vehicle body relative to the wheels, for example under conditions of wheel bounce and travel of the motor vehicle over a road with a rough surface.

Preferably, the sensor comprises an inner cable connected at one of its ends with an unsprung part of the vehicle and at the other of its ends with the lever, and an outer sleeve surrounding the inner cable, the outer sleeve abutting a sprung part of the motor vehicle.

Conveniently, the interconnecting means further includes an angularly movable rod connected with the lever through the intermediary of a first spring arm, and a second spring arm is secured to the angularly movable rod so as to be urged against an abutment as a result of biasing of the first spring arm by tensioning in the portion of the interconnecting means between the sensor and the first spring arm.

Figure 4:
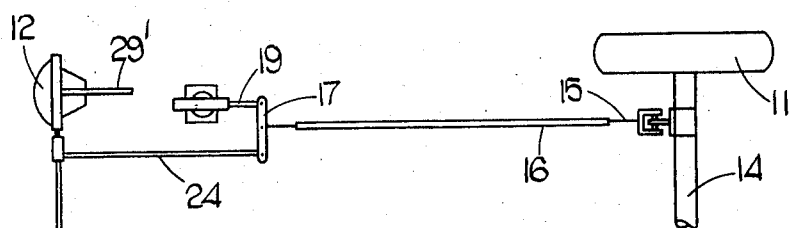
Figures 5, 6:
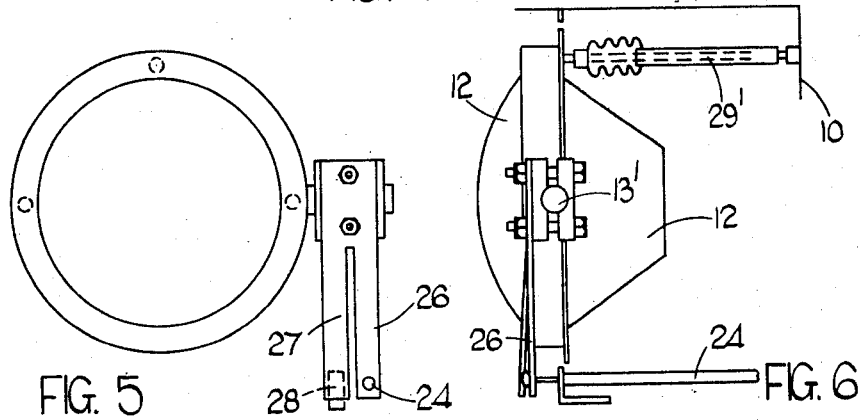

An embodiment of the present invention will now be described, by way of example, with reference to the accompanying drawings, in which:

FIG. 1 is a schematic plan view of part of a motor vehicle incorporating a headlamp tilting mechanism, according to the present invention, FIG. 2 is a schematic perspective view of part of the tilting mechanism shown in FIG. 1, FIG. 3 is a schematic view of another part of the mechanism of FIG. 1, FIG. 4 is a schematic plan view of part of a motor vehicle fitted with a modified headlamp tilting mechanism, also according to the present invention, FIG. 5 is a front view of a headlamp and part of the tilting mechanism of FIG. 4, and FIG. 6 is a side view of the parts shown in FIG. 5.

Referring firstly to FIGS. 1 to 3 of the drawings, the motor vehicle comprises a body 10 (only a floor pan of which is indicated schematically in FIG. 1), wheels 11 (only one rear wheel being illustrated) upon which the body 10 is suspended, a pair of headlamps 12 mounted on a common cross rod 13 which is horizontally disposed and angularly movable relative to the body 10. Angular movement of the cross rod 13 effects tilting movement of the headlamps 12 in a vertical plane. The cross rod 13 forms part of a headlamp tilting mechanism. The motor vehicle also comprises a live rear axle housing 14 which forms an unsprung part of the motor vehicle.

The headlamp tilting mechanism also includes a sensor in the form of an inner cable 15 and an outer sleeve 16. The inner cable 15 is secured at one end to the rear axle housing 14 and at its other end to an intermediate portion of a lever 17 which also forms part of the tilting mechanism. The outer sleeve 16 abuts against the underside of the body 10 at the rear of the motor vehicle so that a change in the attitude of the vehicle body 10 relative to the rear wheels 11 changes the effective length of inner cable 15. It will be manifest that if the load on the rear of the vehicle body 10 is increased, the rear of the vehicle body 10 will sink relative to the wheels 11 and increase the tension applied to outer sleeve 16. In this manner, the effective length of inner cable 15 is decreased. Conversely, if the load at the rear of the vehicle body 10 is lightened, the tension on the outer sleeve 16 is lessened and the effective length of inner cable 15 is increased.

The lever 17 is secured at one end by means of a pivot 18 to a hollow rod 19 which extends into a housing 20 fixed relative to the body 10. An abutment 21 is provided on the rod 19 internally of the housing 20 and a compression spring 22 is disposed around the rod 19 and is lodged between abutment 21 and an end of housing 20 through which rod 19 passes. The end of rod 19 within the housing 20 is open and a piston element 23 projecting from and secured to the housing 20 extends into the hollow rod 19. A silicone fluid containing AEROSIL (Registered Trade Mark) powder dispersed therein is disposed between element 23 and rod 19 and has the effect of opposing sudden movements of the rod 19 relative to element 23 but permitting relatively slow movement. The spring 22 serves to bias rod 19 to the left as viewed in FIG. 3.

At the opposite end of lever 17 to rod 19, a cable 24 is attached through the intermediary of a pivot 25. The cable 24 also forms part of the headlamp tilting mechanism and leads to a free end of a first spring arm 26 which is anchored at its opposite end to the cross rod 13. A second spring arm 27 is also secured to the cross rod 13 and is urged into engagement with an abutment 28 fixed relative to the body 10 when the spring arm 26 is biased as a result of tensioning in cable 24. Also secured to cross rod 13 is a lever 28 whose free end is pivotally secured to a damper 29 which is in turn pivotally secured to the body 10.

In use, the headlamp tilting mechanism is always maintained under tension irrespective of the load carried by the vehicle body 10. Such tensioning of the headlamp tilting mechanism maintains spring arm 27 in engagement with abutment 28. If the load carried by the vehicle body 10 is increased, the effective length of cable 15 decreases as mentioned above. This causes an immediate pivoting of lever 17 in a clockwise direction about pivot 18 as viewed in FIG. 3. Cable 24 is thus drawn to the right as viewed in FIGS. 1 and 2 so as to increase the tension in spring arm 26. Such increase in tension in spring arm 26 is equalised by an increase in the tension in spring arm 27, such equalising of tensions occurring as a result of angular movement of the cross rod 13 to effect a downward tilting of headlamps 12 to compensate for the change in the attitude of the vehicle body as a result of increasing the load at the rear thereof. Assuming the spring arms 26 and 27 to be of equal strengths, there will be only half the angular movement of cross rod 13 that would have occurred if the spring arms 26 and 27 were not present and a rigid lever had interconnected cross rod 13 and cable 24. Bodily movement of pivot 18 immediately after increasing the load carried by the rear of the vehicle body is prevented because movement of rod 19 carrying pivot 18 is prevented as a result of the damping effect of the silicone liquid. However, since the increased loading of the vehicle body occurs for a relatively long time, slow movement of rod 19 occurs to the right as viewed in FIG. 3 so that after the initial downward tilting of the headlamp occurs, a certain amount of upward tilting of the headlamps 12 takes place because the lever 17 effectively pivots about its pivotal connection with cable 15 thus causing movement of cable 24 to the left as viewed in FIG. 3 and a reduction in the tension of spring arm 26. However, the headlamps 12 still remain tilted downwardly compared with their position before the increase in the load carried by the rear of the vehicle body 10 occurred.

If the motor vehicle is accelerated during use, there will be a relatively short term lifting of the front of the vehicle body 10 accompanied by a lowering of the rear of the vehicle body relative to the wheels 11. This change in the position of the rear of the vehicle body 10 relative to the wheels 11 effects an increase in the tension in cable 15 and a pivotal movement of lever 17 in a clockwise direction about pivot 18 to effect a further downward tilting of headlamps 12. However, the duration of the change in the attitude of the vehicle body as a result of acceleration is not sufficient to permit rod 19 to move to any appreciable degree relative to element 23 with the result that no subsequent upward tilt of the headlamps 12 occurs as a result of shifting of the pivot 18 to the right as viewed in FIG. 3.

When the load carried by the rear of the vehicle body 10 is lightened, the tension in cable 15 decreases and the tension in the spring arms 26 causes lever 17 to pivot in an anti-clockwise direction about pivot 18 as viewed in FIG. 3. This causes an upward tilting movement of headlamps 12 since a lightening in the load carried by the rear of the vehicle body 10 is of relatively long duration, the rod 19 will move to the left as viewed in FIG. 3 under the action of spring 22 and as permitted by the silicone liquid so that the pivot 18 is shifted to the left as viewed in FIG. 3. This has the effect of pivoting lever 17 in a clockwise direction about its pivotal attachment to cable 15 to cause an increase in the tension in spring arm 26 and a corresponding downward tilting movement of headlamps 12. A similar situation occurs when braking of the motor vehicle takes place except that the braking is generally not of a sufficient duration for pivot 18 to move under the action of spring 22.

Any very short term changes in the attitude of the vehicle body relative to the wheels 11 are damped out by damper 29 which prevents fluttering of the headlamps 12 under, for example, wheel bounce conditions.

It will thus be seen that the overall effect of the headlamp tilting mechanism is to produce a rather greater amount of headlamp tilting pro rata under acceleration and braking conditions than under changing conditions of the load carried by the rear of the vehicle body 10. This is necessary because one sensor is used to provide headlamp tilting compensation under two separate conditions, one a static load condition and the other a dynamic condition such as occurs under acceleration and braking. If it were not for the provision of the damper lever 17, an over-compensating tilting effect of the headlamps 12 would occur when changes in the load carried by the vehicle body 10 occur. Since the pivot axis of the body differs under changing load conditions from that under changing acceleration or braking conditions.

The time taken for rod 19 to change its position as permitted by the silicone fluid depends, inter alia, upon the type of motor vehicle to which the headlamp tilting system is fitted. However, it is envisaged that a time of 25 seconds for the rod 19 to move would be sufficient for providing compensation under changing load conditions and would enble the correct amount of headlamp tilt to be applied under conditions of braking and acceleration.

Referring now to FIGS. 4 to 6 of the drawings, the motor vehicle illustrated schematically therein is provided with two headlamp tilting systems which are similar to the headlamp tilting system described with reference to FIGS. 1 to 3 of the drawings. Parts of the headlamp tilting mechanism, illustrated in FIGS. 4 to 6 which are similar to the parts of the headlamp tilting system of FIGS. 1 to 3 are accorded the same reference numerals. It will be seen with reference to FIGS. 4 to 6 that the cross rod 13 has been omitted and the headlamps 12 are independently mounted on the body 10 through the intermediary of stub shafts 13' and that one of the headlamp tilting mechanisms is associated with each headlamp 12. Instead of the damper 29 acting on the cross rod 13 as described with reference to FIGS. 1 to 3, a separate damper 29' is connected directly with each headlamp 12.

Apart from the above differences, the headlamp tilting mechanisms illustrated in FIGS. 4 to 6 operate simultaneously in exactly the same way as that described with reference to FIGS. 1 to 3.

I claim:

1. In a motor vehicle having a body suspended on wheels and a headlamp mounted on said body for tilting movement in a vertical plane, a headlamp tilting device comprising (1) a sensor for sensing the attitude of said body relative to said wheels, said sensor producing an output movement related to said attitude; and (2) means operably connecting said sensor with said headlamp; said connecting means including (i) a lever connected with said headlamp and said sensor so that the output movements of said sensor are transmitted through said lever to said headlamp, and (ii) a damper, said damper having (a) a first part fixed relative to said body, (b) a second part movable relative to said first part, and (c) a damping medium which opposes relatively short term movements between said first and second parts; said lever being pivotally connected to said second part so that, when a relatively short term output movement of said sensor occurs, said lever pivots relative to said second part, whilst when a relatively long term output movement of said sensor occurs, the lever moves bodily relative to said body as a result of relative movement between said first and second parts; and said sensor, said headlamp and said second part being connected with said lever in such a manner that a relatively long term output movement of said sensor results in a smaller overall headlamp tilting movement than that resulting from the same output movement which occurs for a relatively short term.

2. The headlamp tilting device according to claim 1, wherein said connecting means further includes a second damper which serves to prevent very short term tilting movement of the headlamps which would otherwise occur as a result of very short term changes in the attitude of said body relative to said wheels, for example under conditions of wheel bounce and travel of the motor vehicle over a road with a rough surface.

3. The headlamp tilting device according to claim 1, wherein said sensor comprises an inner cable connected at one of its ends with an unsprung part of the motor vehicle and at the other of its ends with said lever, and an outer sleeve surrounding said inner cable, said outer sleeve abutting a sprung part of said motor vehicle.

4. The headlamp tilting device according to claim 1, wherein said connecting means further includes an angularly movable rod connected with said lever through the intermediary of a first spring arm, a second spring arm secured to said angularly movable rod, and an abutment against which said second spring arm is urged as a result of biasing of said first spring arm by tensioning in a portion of said connecting means between said sensor and said first spring arm.

5. The headlamp tilting device according to claim 1, wherein said lever is pivotally connected at one of its ends with said second part, is pivotally connected at the other of its ends with a portion of said connecting means leading to said headlamp and is pivotally connected intermediate its ends with said sensor.

* * * * *